United States Patent [19]

Miller et al.

[11] 4,030,869

[45] June 21, 1977

[54] LOCATING RING FOR INJECTION MOLDS

[75] Inventors: Leonard G. Miller, Bloomfield Hills; Raymond P. Hale, St. Clair Shores, both of Mich.

[73] Assignee: Molmec, Inc., Walled Lake, Mich.

[22] Filed: July 15, 1975

[21] Appl. No.: 596,078

[52] U.S. Cl. .............................. 425/247; 425/242 R
[51] Int. Cl.² ......................................... B29F 1/022
[58] Field of Search .............. 425/242 R, 243, 244, 425/245 R, 247, 248, 250, DIG. 224–DIG. 228, 242 B

[56] References Cited

UNITED STATES PATENTS

| | | | |
|---|---|---|---|
| 2,814,821 | 12/1957 | McKee | 425/247 |
| 2,821,750 | 2/1958 | Huelskamp | 425/247 |
| 3,052,925 | 9/1962 | Brownenkant et al. | 425/DIG. 226 |
| 3,694,124 | 9/1972 | Saumsiegle et al. | 425/242 B |
| 3,698,849 | 10/1972 | Czerski | 425/247 |
| 3,915,610 | 10/1975 | Kohler | 425/248 |

FOREIGN PATENTS OR APPLICATIONS

| | | | |
|---|---|---|---|
| 47-01543 | 1/1972 | Japan | 425/243 |
| 261,687 | 9/1968 | U.S.S.R. | 425/DIG. 227 |

*Primary Examiner*—Francis S. Husar
*Assistant Examiner*—William R. Briggs

[57] ABSTRACT

An injection molding assembly for molding plastic parts in mold cavities defined by separable mold parts attached to stationary and movable platens of the assembly. A plastic locating ring is attached to one of the mold parts and is disposed in an opening in the stationary platen for positioning the mold parts relative to the stationary platen and an injection nozzle assembly disposed in the opening of the stationary platen. The locating ring has an outer peripheral surface including a tapered portion and an adjacent axially extending portion whereby the tapered portion guides or leads the axially extending portion into the opening in the stationary platen. The locating ring is defined by inner and outer annular walls integrally interconnected by a base wall and radially extending ribs. The inner wall defines an inclined surface in a central opening for facilitating molten plastic run-off.

14 Claims, 6 Drawing Figures

LOCATING RING FOR INJECTION MOLDS

This invention relates to injection molding assemblies of the type for injection molding plastic parts in mold cavities defined by separable mold parts. More specifically, the subject invention relates to a locating ring of the type attached to one of the mold parts for positioning the mold part relative to the injection molding machine as the mold part is attached to the machine.

An injection molding machine typically includes a stationary platen to which one of the mold parts is attached and a movable platen to which the other mold part is attached. The movable platen moves relative to the stationary platen to move the mold parts together for injecting fluid plastic into the cavities defined by the mold parts and for moving the mold parts apart for removing the plastic part. The mold part supported on the stationary platen has an inlet passage and an injection nozzle is disposed in an opening in the stationary platen for injecting fluid plastic into the inlet passage in the mold part.

Normally, a machined metal locating ring is attached to the stationary mold part about the inlet passage therein for positioning the mold part relative to the stationary platen as the mold part is being attached to the stationary platen. The locating ring has an axially extending cylindrical surface which slides into the opening in the stationary platen as the mold part is being positioned for attachment to the stationary platen. Frequently, the very heavy mold assembly is suspended from a crane, or the like, by a chain and hangs at an askewed angle before being attached to the stationary platen. This, of course, makes it awkward to guide the locating ring into the opening in the stationary platen because the locating ring must be perfectly axially aligned with the opening for insertion thereinto. If the locating ring is not perfectly axially aligned with the opening and is forced thereinto at an angle, damage occurs to the locating ring or to the opening in the stationary platen. Damage to the opening in the stationary platen is very serious as the opening must be remachined or the complete platen must be replaced.

The locating ring of the subject invention overcomes such problems associated with the prior art metal locating rings. First, the subject locating ring is made of plastic whereby upon misalignment with an opening in the stationary platen, the plastic locating ring, being softer than the metal of the stationary platen, will deform or break and can easily be replaced without damage to the stationary platen. Additionally, the outer peripheral surface of the locating ring has a tapered portion to initially guide the locating ring into the cylindrical opening in the stationary platen. The tapered portion is followed by an axially extending portion on the outer peripheral surface and which slides into the opening in the stationary platen to prevent transverse movement of the mold relative to the stationary platen. In other words, the tapered portion axially aligns the locating ring with the opening in the stationary platen in the event the mold assembly is askewed to guide the axially extending portion into the opening. Once in this position, the mold part is secured to the stationary platen by bolts, or the like. Further, the locating ring includes a central opening, a portion of which is inclined radially inwardly from a face of the locating ring to facilitate the run-off of molten plastic which may escape from the injection nozzle.

The subject locating ring includes cavities extending thereinto from the first face of the locating ring and ribs extend between the annular walls of the base of the locating ring. Enlarged portions extend between the first and second faces of the locating ring with bores therethrough and fastening means may extend through the bores to secure the locating ring to the first mold part. Because of such a construction the plastic locating ring may be made thicker or wider in the axial direction than the prior art metal locating rings.

Other objects and attendant advantages of the present invention will be readily appreciated as the same becomes better understood by reference to the following detailed description when considered in connection with the accompanying drawings wherein.

Figure 1:
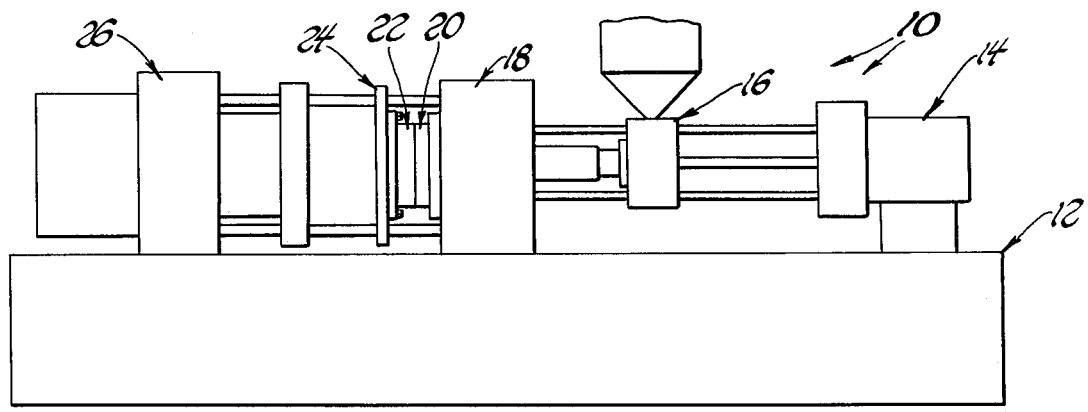
FIG. 1 is an elevational view showing the basic elements of an injection molding assembly.

An injection molding assembly for injection molding plastic components and incorporating the subject invention is generally shown at 10 in FIG. 1. The injection molding assembly 10 includes a frame generally indicated at 12, an injection ram assembly generally indicated at 14, a plastic melt chamber generally indicated at 16, a stationary platen generally indicated at 18, a first or stationary mold part generally indicated at 20, a second or movable mold part generally indicated at 22, a movable platen generally indicated at 24, and clamp cylinder or mold separating means generally indicated at 26 for moving the movable platen 24 relative to the stationary platen 18.

The injection molding assembly 10 operates as follows: Granular plastic material flows from a hopper to the melt chamber 16 where it is heated until molten or liquified. The injection ram assembly 14 forces the liquid or molten plastic through an injection nozzle (to be described hereinafter) and into a mold cavity defined by the mold parts 20 and 22. As is well known, the mold cavity is formed between the first mold part 20 and the second mold part 22. After the molten plastic has solidified within the mold cavity, the two mold parts are separated along mold parting line 30 and the solid plastic part may be freely removed between the two mold parts. The separating means 26 moves the movable platen 24 to and away from the stationary platen 18. In other words, the movable platen 24 moves the movable mold part 22 into engagement with the stationary mold part 20 for injecting molten plastic thereinto for forming a plastic part and thereafter moves the movable mold part 22 out of engagement with the stationary mold part 20 whereby the finished plastic part may be removed from the machine 10.

Figure 2:
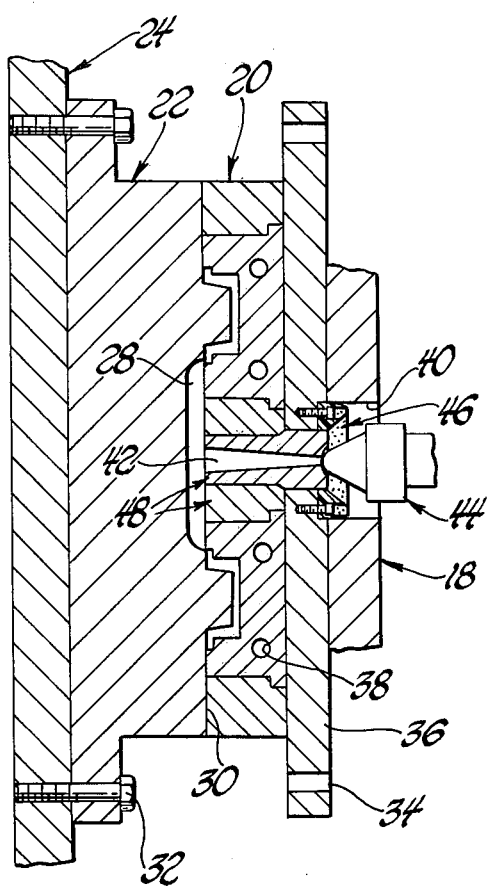
FIG. 2 is a fragmentary cross-sectional view showing the movable and stationary platens, the mold parts and the injection nozzle all in the position for injecting plastic into the mold parts.
Figure 3:
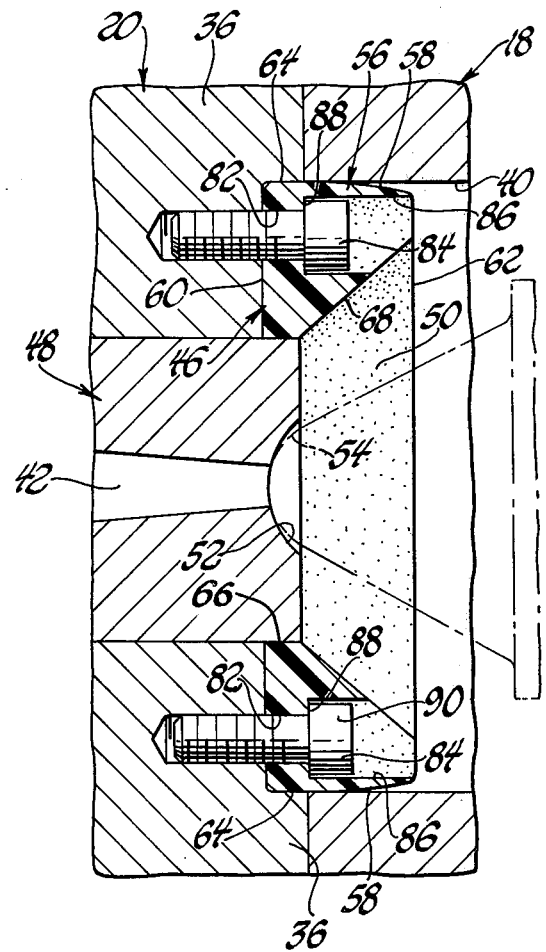
FIG. 3 is an enlarged fragmentary cross-sectional view showing the locating ring attached to the mold part and disposed in the opening in the stationary platen.
Figure 4:
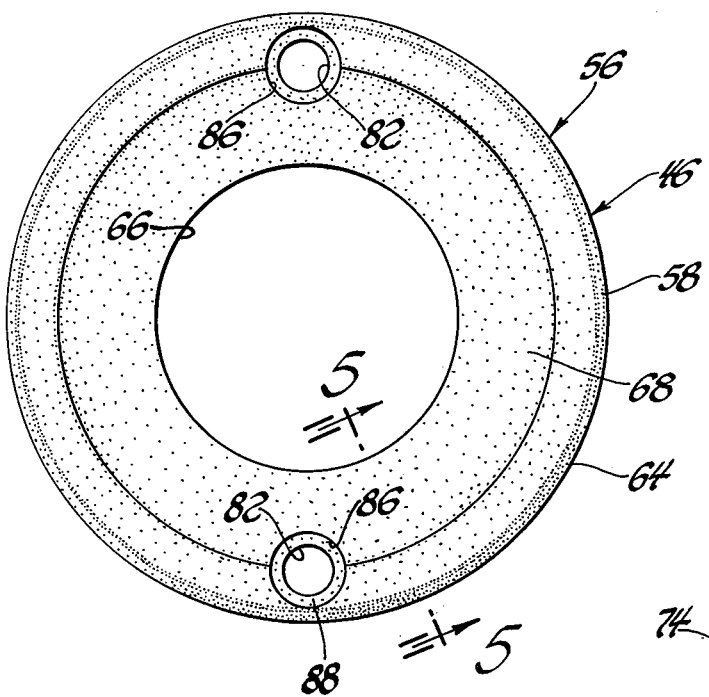
FIG. 4 is a frontal view of the locating ring of the subject invention.
Figure 5:
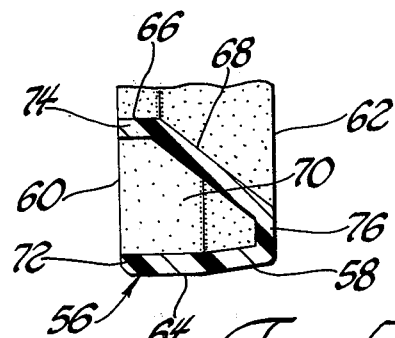
FIG. 5 is a fragmentary cross-sectional view taken substantially along lines 5—5 of FIG. 4.
Figure 6:
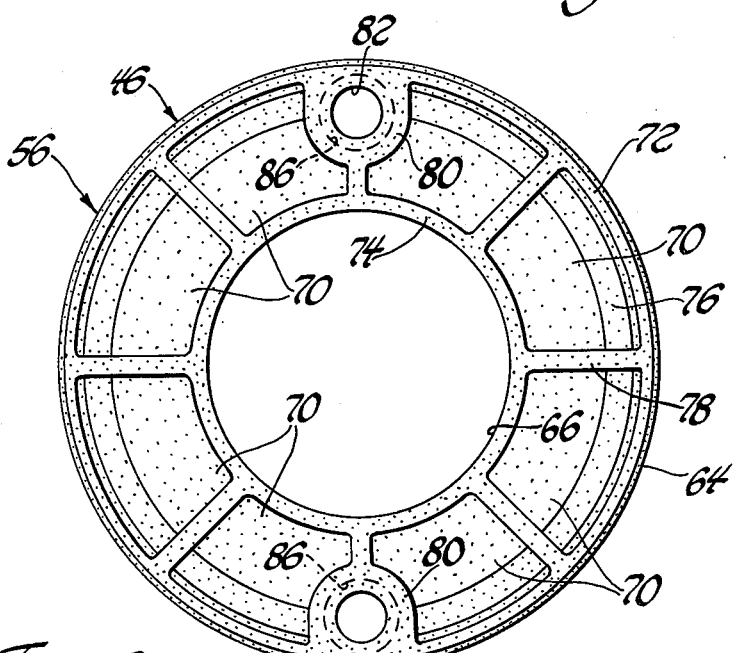
FIG. 6 is a rear view of the locating ring.

As can be seen in FIG. 2, the second or movable mold part 22 is supported by and attached to the movable platen 24 by rear mounting bolts 32 extending through the mold part 22 and threadedly engaging the movable platen 24. The first mold part 20 comprises a plurality of components connected together, one of the components being a stationary platen 36 which attaches the first mold part ot the stationary platen 18 by means of bolts (not shown) which extend through the front mounting bolt holes 34 and engage the stationary platen. The mold parts 20 and 22 define a mold cavity 28 therebetween into which molten plastic is injected as described above for defining a plastic part. The first mold part 20 further includes water lines 38 formed therein for cooling purposes. That is, water flows in the water lines 38 to cool the first mold part 20 and subsequently the liquid plastic positioned in the mold cavity 28.

The stationary platen 18 includes a platen opening 40 formed therethrough. A sprue bushing assembly generally indicated at 48 is supported by the stationary mold part 20 and defines an inlet passage 42 which extends between the mold cavity 28 and the platen opening 40. An injection nozzle assembly generally indicated at 44 is part of the injection ram assembly 14 and receives molten plastic from the plastic melt chamber 16. The nozzle assembly 44 is normally disposed in the platen opening 40 to coact with the sprue bushing assembly 48 for injecting plastic material into the inlet passage 42.

An annular locating ring generally indicated at 46 is secured to the first mold part 20 and is disposed in the platen opening 40. The sprue bushing 48 extends from the first mold part 20 and the locating ring 46 includes a central opening 50 disposed about and in engagement with the sprue bushing assembly 48. The sprue bushing assembly 48 includes a depressed or concave surface 52 which coacts with the convex end portion or surface 54 of the injection nozzle 44. The convex surface 54 of the injection nozzle 44 engages the concave surface 52 of the sprue bushing 48 during the injection of molten plastic from the injection nozzle 44 into the inlet passage 42 and to the mold cavity 28.

The locating ring 46 includes an outer peripheral surface generally indicated at 56 and which engages opening 40 in the stationary platen 18 for positioning the first mold part 20 relative to the stationary platen 18 during assembly of the mold part 20 to the stationary platen 18. The outer peripheral surface 56 of the locating ring 46 includes a tapered surface portion 58 which initially guides the locating ring 46 into the opening 40 in the stationary platen 18. The locating ring 46 also includes a first face 50, which engages the first mold part 20, and a second face 62 which is disposed in the opening 40 of the stationary platen 18.

The outer peripheral surface 56 of the locating ring 46 further includes an axially extending surface portion 64 which is in abutting engagement with the opening 40 in the stationary platen 18 to prevent transverse movement of the first mold part 20 relative to the stationary platen 18. That is, after such abutting engagement is achieved, the first mold part 20 can only move along the axis of the opening 40, or axially of the nozzle 44. The tapered portion 58 is inclined at an angle of approximately 7° relative to the axially extending portion 64. The 7° incline of the tapered portion 58 facilitates the positioning of the first mold part 20 relative to the stationary platen 18 prior to securing the stationary plate 36 of the first mold part 20 to the stationary platen 18. The axially extending portion 64 extends axially and perpendicularly from the first face 60 of the locating ring 46 and toward the second face 62 and terminates at the tapered portion 58, the tapered portion 58 extending radially inwardly from the axially extending portion 64 to the second face 62.

The locating ring 46 includes a central opening 66 extending therethrough. The central opening 66 allows the injection nozzle 44 to move axially into contact with the sprue bushing assembly 48 and establish communication with the inlet passage 42 of the sprue bushing assembly 48. The central opening 66 includes an inclined portion 68 which extends radially inwardly from the second face 62 of the locating ring 46. The central opening 66 in the locating ring 46 disposed about and in engagement with the sprue bushing 48 and the inclined portion 68 extends radially inwardly from the second face 62 and terminates adjacent the sprue bushing assembly 48. The inclined portion 68 facilitates the flow of molten plastic which may inadvertently flow from the injection nozzle 44. In other words, such unwanted molten plastic will flow away from the locating ring 46 and injection nozzle 44 due to the inclined surface portion 68 so as not to build up in solid form and cause potential interference problems between the sprue bushing assembly 48 and the injection nozzle 44.

The locating ring 46 includes cavities 70 extending from the first face 60. The cavities 70 define an outer annular wall 72 which, in turn, defines the outer peripheral surface 56. The cavities 70 also define an inner annular wall 74 which, in turn, defines the central opening 66. Additionally, the cavities 70 define a base wall 76 which integrally connects the annular walls 72 and 74 and perpendicularly to the base 76.

The locating ring 46 further includes attachment means for attaching the locating ring 46 to the plate 36 of the stationary mold part 20. More specifically, the attachment means includes the enlarged portions 80 which extend between the first and second faces 60 and 62. Bores 82 are formed through the enlarged portions 80 to allow the positioning of fastening means such as bolts 84 to extend through the bores 82 and threadedly secure the locating ring 46 to the first mold part 36. The bores 82 are countersunk to define enlarged sections 86 which extend from the second face 62 for defining shoulders 88 in each of the bores 42. The bolts 84 include head 90 disposed in the enlarged sections 86 and engaging the shoulders 88.

As will be appreciated, a different mold assembly, made up of different mold parts, is utilized for different plastic parts. Consequently, one mold assembly may be removed from an injection molding machine and another substituted to run a different plastic part. The mold parts 20 and 22 are connected together and have the locating ring 46 attached thereto when not in the injection molding machine. To mount a mold assembly in the molding machine 10, the movable platen is in the open position spaced significantly from the stationary platen. The mold assembly is typically hung by a chain or the like from an overhead support, such as a crane, fork lift truck, or the like, so as to be suspended in the space between the platens. Frequently, the mold assembly hangs so that the plane of the plate 36 of the stationary mold part 20 is not parallel to the plane of the stationary platen 18. Thus, the mold assembly must be manually "jockeyed" around to align and insert the locating ring 46 into the opening 40 of the stationary platen. As will be appreciated, the tapered surface portion 58 facilitates such initial misalignment and guides the mold assembly into the proper position by axially aligning the axially extending surface portion 64 of the locating ring 46 with the opening 40 to properly position the mold assembly relative to the stationary platen. Once in position, the stationary mold part 20 is attached to the stationary platen 18 and thereafter the movable platen 24 is moved forward to attach the movable mold part 22 to the movable platen 24. In the event the locating ring 45 is not perfectly aligned with the opening 40 and is forced into the opening 40, the plastic locating ring will give or break to prevent damage to the assembly such as permanent damage to the opening 40. The added thickness of the locating ring 46 between the faces 60 and 62 facilitates alignment of the locating ring 46 with the opening 40. This added thickness is an important feature of the invention, as all prior art locating rings have been of less thickness and have, therefore, made it much more difficult for the prior art locating rings to locate the mold part. Additionally, the combination of the added thickness and the layer on the outer peripheral surface is important to provide a locating ring which functions much more satisfactorily during the locating operation than the prior art locating rings. To provide the results not attained by the prior art locating rings, the thickness of the locating ring should be in the range of ¾ inch to 1½ inch.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

We claim:

1. An injection molding assembly for injection molding plastic components and comprising; a stationary platen having an opening therein, a movable platen, a first mold part having an inlet passage and supported on said stationary platen, a second mold part supported on said movable platen for movement into and out of engagement with said first mold part, an injection nozzle disposed in said opening for injecting plastic material into said inlet passage in said first mold part, an annular locating ring attached to said first mold part and disposed in said opening for locating said first mold part relative to said stationary platen, said locating ring being made of plastic, said locating ring including an outer peripheral surface engaging said opening in said stationary platen for positioning said first mold part relative to said stationary platen, said outer peripheral surface of said locating ring including a tapered portion extending radially inwardly for guiding said locating ring into said opening in said stationary platen, said locating ring including a first face engaging said first mold part and a second face spaced therefrom and disposed in said opening in said stationary platen, said outer peripheral surface including an axially extending portion extending from said first face toward said second face and terminating at said tapered portion, said tapered portion extending radially inwardly from said axially extending portion to said second face, said axially extending portion being in abutting engagement with said opening in said stationary platen to prevent transverse movement of said first mold part relative to said stationary platen, said locating ring including a central opening therethrough, said central opening including an inclined portion extending radially inwardly from said second face thereof, said locating ring including cavities extending thereinto from said first face thereof to define an outer annular wall defining said outer peripheral surface and an inner annular wall defining said central opening and a base connecting said annular walls and defining said second face and ribs extending between said annular walls and said base.

2. An assembly as set forth in claim 1 wherein said tapered portion is inclined inwardly at an angle of approximately 7° relative to said axially extending portion.

3. An assembly as set forth in claim 1 wherein said locating ring includes attachment means for attaching said ring to said first mold part.

4. An assembly as set forth in claim 3 wherein said attachment means comprises enlarged portions extending between said first and second faces with bores therethrough, fastening means extending through said bores and secured to said first mold part for securing said locating ring to said first mold part.

5. An assembly as set forth in claim 4 wherein said bores have enlarged sections extending therealong from said second face for defining a shoulder in each of said bores, said fastening means including heads disposed in said enlarged sections and engaging said shoulders.

6. An assembly as set forth in claim 1 including a sprue bushing extending from said first mold prt, said central opening of said locating ring being disposed about and in engagement with said sprue bushing.

7. An assembly as set forth in claim 6 wherein said central opening of said locating ring includes an inclined portion extending radially inwardly from said second face thereof and terminating adjacent said sprue bushing.

8. An assembly as set forth in claim 7 wherein said tapered portion is inclined inwardly at an angle of approximately 7° relative to said axially extending portion.

9. A locating ring for use in an injection molding machine of the type including a stationary platen having an opening therein, a movable platen, a first mold part having an inlet passage and supported on the stationary platen, a second mold part supported on the movable platen for movement into and out of engagement with the first mold part and an injection nozzle disposed in the opening for injecting plastic material into the inlet passage in the first mold part; said locating ring comprising an annular plastic ring, said ring including attachment means for use in attaching said ring to the first mold part, said ring including an outer peripheral surface for engaging the opening in the stationary platen for positioning the first mold part relative to the stationary platen during attachment of the first mold part to the stationary platen, said outer peripheral surface of said locating ring including a tapered portion extending radially inwardly for guiding said locating ring into the opening in the stationary platen, said locating ring including a first face for engaging the first mold part and a second face spaced therefrom for disposition in the opening in the stationary platen, said outer peripheral surface including an axially extending portion extending from said first face toward said second face and terminating at said tapered portion, said tapered portion extending radially inwardly from said axially extending portion to said second face, said tapered portion being inclined inwardly at an angle of approximately 7° relative to said axially extending portion, said axially extending portion being provided for abutting engagement with the opening in the stationary platen for preventing the transverse movement of the first mold part relative to the stationary platen, said locating ring including a central opening therethrough, said central opening including an inclined portion extending radially inwardly from said second face thereof, said locating ring including cavities extending thereinto from said first face thereof to define an outer annular wall defining said outer peripheral surface and an inner annular wall defining said central opening and a base connecting said annular walls and defining said second face and ribs extending between said annular walls and said face.

10. The locating ring as set forth in claim 9 wherein said tapered portion is inclined inwardly at an angle of approximately 7° relative to said axially extending portion.

11. The locating ring as set forth in claim 9 wherein said attachment means comprises enlarged portions extending between said first and second faces with bores therethrough for fastening said locating ring to the first mold part.

12. The locating ring as set forth in claim 11 wherein said bores have enlarged sections extending therealong from said second face for defining a shoulder in each of said bores whereby fastening means having heads may be disposed in said bores with the heads engaging said shoulders for attaching said locating ring to the first mold part.

13. The locating ring as set forth in claim 9 wherein said central opening of said locating ring includes an inclined portion extending radially inwardly from said second face thereof.

14. The locating ring as set forth in claim 13 wherein said tapered portion is inclined inwardly at an angle of approximately 7° relative to said axially extending portion.

* * * * *